Patented Sept. 15, 1936

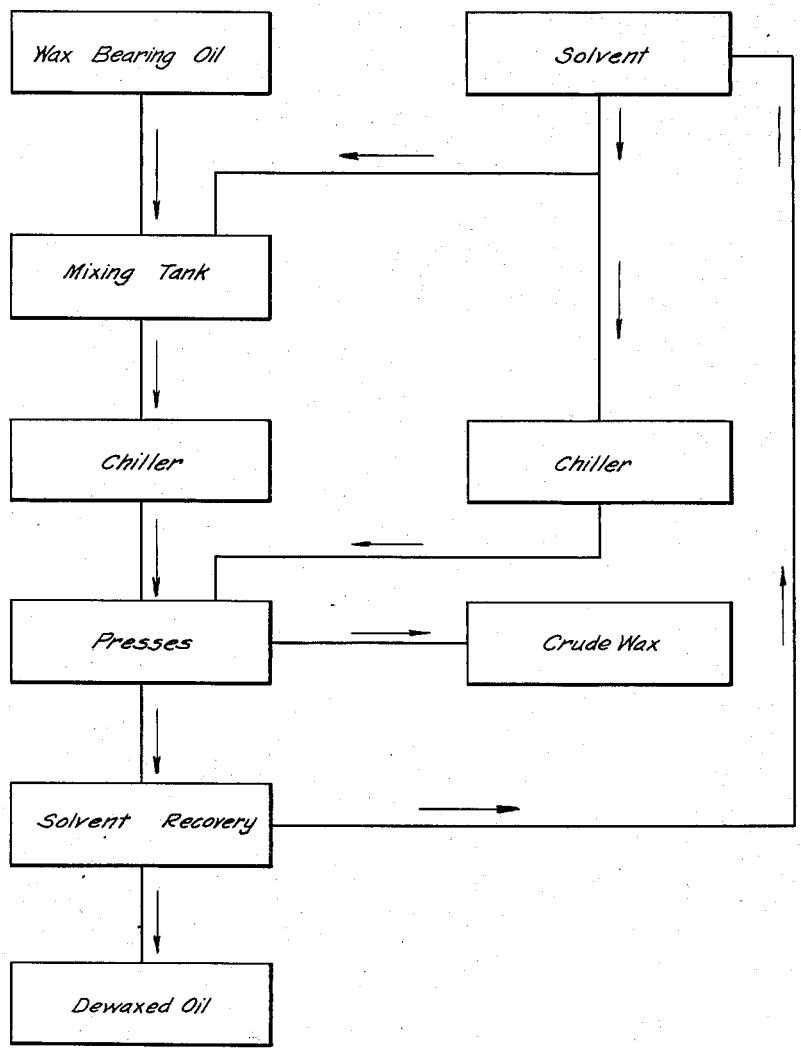

2,054,416

UNITED STATES PATENT OFFICE 2,054,416

DEWAXING WAX-BEARING OIL

Francis X. Govers, Vincennes, Ind., assignor to Indian Refining Company, Lawrenceville, Ill., a corporation of Maine Application March 19, 1934, Serial No. 716,237

11 Claims. (Cl. 196—18)

This invention relates to the dewaxing of hydrocarbon oil and more particularly to an improved process of removing paraffin wax from wax-bearing petroleum oil for the production of low pour test lubricating oil.

More specifically, my invention contemplates dissolving a wax-bearing oil in a suitable dewaxing solvent such as, for example, mixtures of acetone and benzol or acetone, benzol and toluol. The resultant liquid mixture is rapidly chilled to a temperature below 0° F. whereby the wax is precipitated and the chilled mixture filtered to separate the precipitated wax from the oil and solvent in the form of a filter cake of slack wax. The filter cake is then washed at a low temperature with a quantity of the chilled dewaxing solvent to remove therefrom any occluded oil. The solvent is finally separated from the dewaxed oil by a process of distillation. The filter cake of slack wax is similarly treated to free it from any retained solvent. The solvents are recovered and returned to storage for reuse in the process.

It is generally recognized that wax-bearing oils may contain either one or both of two types of paraffin waxes—low melting point waxes and high melting point waxes. The removal of the latter from the oils with which they are associated is usually a difficult undertaking with most of the usual dewaxing solvents. For example, on diluting a wax-bearing oil containing high melting point waxes with naphtha and chilling the mixture, the wax separates out as minute crystals. The wax in this form tends to occlude the oil in such a manner that the mass can be filtered only with great difficulty; the rates of filtration are so low as to be impracticable commercially and yields of the dewaxed oil also are low.

I have discovered that by completely dissolving the wax-bearing oil in a suitable solvent, and then chilling the mixture rapidly to the desired dewaxing temperature, the wax content may be precipitated in such a form that the chilled mixture may be filtered in an economical manner at rapid rates. Moreover, the resulting wax cake is of such a character that it may effectively be washed in situ with an additional portion of chilled solvent to remove the oil associated therewith. The filtrate thus attained may be added to the main filtrate to produce a high total yield of wax-free oil.

These facts are of considerable commercial significance inasmuch as they enable substantial reductions to be made in the cost of plants of a given capacity, as compared with previous practice and, as indicated above, high yields of finished oil may be secured.

By the term "suitable solvent" I mean a liquid which at temperatures of approximately 100° F. has substantially complete solvent action on a wax-bearing oil substantially free from constituents having a boiling point equal to or below that of gas oil and at temperatures of —5° F. and below has substantially complete solvent action on the liquid hydrocarbons therein but substantially no solvent action on the solid hydrocarbons therein and of such a nature that, upon cooling, a solution of such wax-bearing oil to 0° F., and removing the solid hydrocarbons so precipitated and the solvent liquid, the resulting oil has a pour test not substantially above 0° F.

As has already been pointed out, I may employ a mixture of acetone and benzol or a mixture of acetone, benzol and toluol as a dewaxing solvent. In the case of the former, I usually employ a mixture consisting of in the neighborhood of 35% of acetone and 65% of benzol, however, the composition may vary depending on such factors as the type of oil, the type of wax, as well as the quantities of wax to be removed. The acetone, benzol, toluol mixture differs only in that commercial benzol which may contain varying proportions of toluol is substituted for the pure benzol.

In addition to the above described solvent mixtures, I may also employ mixtures such as acetone and toluol, sulfur dioxide and monochlor benzene, dichlor ethylene and sulfur dioxide.

The ratio of the suitable solvent to wax-bearing oil used in operating in accordance with the present process is determined in part by the viscosity of the oil undergoing treatment and in part by the pour point desired in the dewaxed oil. In the case of low viscosity oils, a ratio of three parts of solvent to one part of oil permits of the most economical operation. In the case of high viscosity oils, the ratio of solvent to oil is higher and may be of the order of four or five. In all cases the choice of the proper solvent-oil ratio is also directly influenced by factors such as the quantity of wax present in the oil and the economies involved.

My invention will be more clearly understood from the following description considered in connection with the accompanying drawing where there is shown a flow diagram in accordance with my invention.

In the operation of the process, a charge of the proper amount of solvent is delivered into a gas-tight mixing tank which is provided with warming coils and means for agitating the contents thereof. The proper quantity of wax-bearing oil is drawn from warmed storage tanks and charged into the solvent. The mixture is then thoroughly agitated at a temperature sufficiently elevated to insure the complete solution of both the oil and wax in the solvent mixture. The resulting solution is pumped through the chilling equipment which may include heat exchangers for first precooling the solution to a moderately low temperature by heat interchange with chilled dewaxed oil. The chilling proper may be conducted in any conventional manner. For instance, the solution may be brought into heat interchange with brine cooled in a refrigerating plant or with directly expanded ammonia. The chilling is conducted at a rapid rate which may be from 50° to 300° F. per hour. The use of these high rates of chilling or "shock-chilling" as it is sometimes termed by those skilled in the art is of considerable importance. It has been found that the wax content is thereby precipitated in such a form that it can be separated rapidly and effectively by a process of filtration. For filtering, a pressure filter is employed which is provided with means for washing the filter cake of separated wax. As soon as the filtration operation has proceeded to a point where the filter cake of wax has built up to an optimum thickness, the filtration is stopped and any unfiltered oil is removed from the filter. The filter cake is then blown with flue gas to displace as much of the solvent solution of oil remaining therein as possible, after which the wax cake is thoroughly washed with a quantity of chilled dewaxing solvent. This serves to remove a large proportion of any of the remaining oil occluded in the wax cake. In this connection, it may be desirable to chill the washing solvent to a somewhat lower temperature than that of the chilled suspension of crystalline wax in the solvent-oil solution to avoid solution of the slack wax in the solvent.

The filtrate resulting from the filtration operation is collected in a suitable manner. The dewaxing solvent contained therein may be removed by distillation to produce the finished wax-free oil.

In a typical example, a wax distillate from a Mid-Continent crude having an A. P. I. gravity of 25.0 and a viscosity of 61 seconds Saybolt Universal at 210° F. was treated in accordance with my process. This oil was mixed with three volumes of dewaxing solvent consisting of about 35% acetone and 65% of commercial 90% benzol, and the mixture was then brought to a temperature of about 105° F., at which temperature the mixture was thoroughly agitated to insure complete solution of the distillate in the solvent mixture. The resulting solution was then rapidly chilled to a temperature of −10° F., at which temperature the wax was precipitated. The suspension of precipitated wax in solvents and oil was then filtered at a temperature of about −10° F. whereby the wax was separated. The separated wax while still in the filter was then subjected to washing with a quantity of the dewaxing solvent having a temperature of about −15° F. whereby oil occluded in the wax was removed. The wash containing a small proportion of oil was then mixed with the solution of dewaxed oil in solvent.

The solution of dewaxed oil in solvent was then subjected to distillation whereby all of the solvent was removed from the wax-free oil. The tests of this oil, together with the tests of the undewaxed oil, appear in the following table under the proper headings:

| | Undewaxed oil | Dewaxed oil |
|---|---|---|
| Gravity, A. P. I. | 25.0 | 23.6 |
| Viscosity Saybolt universal at 100° F. in seconds | 557 | 712 |
| Viscosity Saybolt universal at 130° F. in seconds | 228 | 270 |
| Viscosity Saybolt universal at 210° F. in seconds | 61 | 66 |
| Pour ° F | | −7 |

In the operation of the process it is desirable that the solvents be maintained substantially in an anhydrous condition. This is advantageously effected by washing the solvent mixture with a concentrated solution of sodium carbonate or by passing it through beds of salt, soda lime or other similar dehydrating agents which are chemically inert toward the solvent.

Obviously many modifications and variations of the invention, as hereinbefore set forth, may be made without departing from the spirit and scope thereof, and therefore only such limitations should be imposed as are indicated in the appended claims.

I claim:

1. A method of dewaxing a wax-bearing oil comprising mainly constituents of cylinder stock viscosity which comprises mixing the oil with a solvent dewaxing mixture consisting essentially of acetone and benzol, agitating the resulting mixture at a temperature sufficient to effect complete solution of the wax and oil in the dewaxing solvent, rapidly chilling the resultant solution at a rate of from 50° to 300° F. per hour to a temperature of 0° F. or below whereby the wax is precipitated, separating the precipitated wax from the solution of dewaxed oil in solvent, washing the separated wax with a portion of chilled dewaxing solvent mixture to remove occluded oil, and then separating the dewaxed oil from the solvents.

2. A method of dewaxing a wax-bearing oil comprising mainly constituents of cylinder stock viscosity which comprises mixing the oil with a dewaxing solvent consisting essentially of about 35% acetone and 65% benzol, bringing the resulting mixture to an elevated temperature sufficient to effect complete solution of the wax and oil in the dewaxing solvent, rapidly chilling the resultant solution to a temperature of 0° F. or below whereby the wax is precipitated, separating the precipitated wax from the solution of dewaxed oil in solvents, washing the separated wax with a portion of chilled dewaxing solvent mixture to remove remaining oil, and then separating the dewaxed oil from the solvent by distillation.

3. A method of dewaxing a wax-bearing oil comprising mainly constituents of cylinder stock viscosity which comprises mixing the oil with a solvent dewaxing mixture consisting essentially of acetone, benzol and toluol, bringing the resulting mixture to an elevated temperature sufficient to effect complete solution of the wax and oil in the dewaxing solvent, rapidly chilling the resultant solution at a rate of from 50° to 300° F. per hour to a temperature of 0° F. or below whereby the wax is precipitated, separating the precipitated wax from the solution of dewaxed oil in solvent, washing the separated wax with a portion of chilled dewaxing solvent mixture to remove occluded oil, and then separating the dewaxed oil from the solvent by distillation.

4. A method of dewaxing a wax-bearing oil comprising mainly constituents of cylinder stock viscosity which comprises mixing the oil with a solvent dewaxing mixture consisting essentially of acetone and benzol to form a mixture, heating the mixture to a temperature above the solution temperature which characterizes the particular wax-bearing oil and the solvent dewaxing mixture to effect complete solution of the oil and wax in solvent, rapidly chilling the resultant solution to a temperature of below 0° F. whereby the wax is precipitated, separating the precipitated wax from the solution of dewaxed oil in solvent by filtration in a filter, washing the wax in situ in the filter with a quantity of chilled dewaxing solvent to remove occluded oil, and then separating the dewaxed oil from the solvent by distillation.

5. A method of dewaxing a wax-bearing oil comprising mainly constituents of cylinder stock viscosity which comprises mixing the oil with a solvent liquid which at temperatures of approximately 100° F. has substantially complete solvent action on a wax-bearing oil substantially free from constituents having a boiling point equal to or below that of gas oil and at temperatures of —5° F. and below has substantially complete solvent action on the liquid hydrocarbons therein but substantially no solvent action on the solid hydrocarbons therein and of such a nature that upon cooling a solution of such wax-bearing oil in the solvent liquid to 0° F. and removing the solid hydrocarbons so precipitated and the solvent liquid, the resulting oil has a pour test of substantially not more than 0° F., bringing the resultant mixture to an elevated temperature sufficient to effect complete solution of the wax and oil in the dewaxing liquid, rapidly chilling the resultant solution at a rate of from 50° to 300° per hour to a temperature of 0° F. or below whereby the wax is precipitated, separating the precipitated wax from the solution of dewaxed oil in solvent, washing the separated wax with a portion of chilled dewaxing solvent mixture to remove occluded oil, and then separating the dewaxed oil from the solvent by distillation.

6. A method of dewaxing a wax-bearing oil comprising mainly constituents of cylinder stock viscosity which comprises mixing the oil with a solvent liquid which at temperatures of approximately 100° F. has substantially complete solvent action on a wax-bearing oil substantially free from constituents having a boiling point equal to or below that of gas oil and at temperatures of —5° F. and below has substantially complete solvent action on the liquid hydrocarbons therein but substantially no solvent action on the solid hydrocarbons therein and of such a nature that upon cooling a solution of such wax-bearing oil in the solvent liquid to 0° F. and removing the solid hydrocarbons so precipitated and the solvent liquid, the resulting oil has a pour test of substantially not more than 0° F., bringing the resultant mixture to an elevated temperature sufficient to effect complete solution of the wax and oil in the dewaxing liquid, rapidly chilling the resultant solution at a rate of from 50° to 300° per hour to a temperature of 0° F. or below whereby the wax is precipitated, filtering the precipitated wax from the solution of dewaxed oil in solvent, and then separating the dewaxed oil from the solvent by distillation.

7. A method of dewaxing a wax-bearing oil comprising mainly constituents of cylinder stock viscosity which comprises mixing the oil with a solvent liquid which at temperatures of approximately 100° F. has substantially complete solvent action on a wax-bearing oil substantially free from constituents having a boiling point equal to or below that of gas oil and at temperatures of —5° F. and below has substantially complete solvent action on the liquid hydrocarbons therein but substantially no solvent action on the solid hydrocarbons therein and of such a nature that upon cooling a solution of such wax-bearing oil in the solvent liquid to 0° F. and removing the solid hydrocarbons so precipitated and the solvent liquid, the resulting oil has a pour test of substantially not more than 0° F., bringing the resultant mixture to an elevated temperature sufficient to effect complete solution of the wax and oil in the dewaxing liquid, rapidly chilling the resultant solution at a rate of from 50° to 300° per hour to a temperature of 0° F. or below whereby the wax is precipitated, separating the precipitated wax from the solution of dewaxed oil in solvent by filtration in a filter, washing the wax in situ in the filter with a quantity of chilled dewaxing solvent to remove occluded oil, and then separating the dewaxed oil from the solvent by distillation.

8. A method of dewaxing a wax-bearing oil comprising mainly constituents of cylinder stock viscosity which comprises mixing the oil with a dewaxing solvent having the essential solvent properties of a mixture of acetone and benzol, bringing the resultant mixture to an elevated temperature sufficient to effect complete solution of the wax and oil in the dewaxing solvent, rapidly chilling the resultant solution at the rate from 50° to 300° F. per hour to a temperature of 0° F. or below whereby the wax is precipitated, separating the precipitated wax from the solution of dewaxed oil and solvent, washing the separated wax with a portion of chilled dewaxing solvent to remove occluded oil, and then separating the dewaxed oil from the solvent by distillation.

9. A method of dewaxing a wax-bearing oil comprising mainly constituents of cylinder stock viscosity which comprises mixing the oil with a solvent having the essential solvent properties of a mixture containing about 35% acetone and about 65% benzol, bringing the resultant mixture to an elevated temperature sufficient to effect complete solution of the wax and oil in the dewaxing solvent, rapidly chilling the resultant solution at the rate of from 50° to 300° F. per hour to a temperature of 0° F. or below whereby the wax is precipitated, separating the precipitated wax from the solution of dewaxed oil and solvent, washing the separated wax with a portion of chilled dewaxing solvent to remove occluded oil, and then separating the dewaxed oil from the solvent.

10. A method of dewaxing a wax-bearing oil comprising mainly constituents of cylinder stock viscosity which comprises mixing the oil with a dewaxing solvent having the essential solvent properties of a mixture of acetone and benzol, bringing the resultant mixture to an elevated temperature sufficient to effect complete solution of the wax and oil in the dewaxing solvent, rapidly chilling the resultant solution at a rate of from 50° to 300° F. per hour to a temperature of 0° F. or below whereby the wax is precipitated, separating the precipitated wax from the solution of dewaxed oil in solvent, and then separating the dewaxed oil from the solvent.

11. A method of dewaxing a wax-bearing oil comprising mainly constituents of cylinder stock viscosity which comprises mixing the oil with a solvent having the essential solvent properties of a mixture containing about 35% acetone and about 65% benzol, bringing the resultant mixture to an elevated temperature sufficient to effect complete solution of the wax and oil in the dewaxing solvent, rapidly chilling the resultant solution at a rate of from 50° to 300° F. per hour to a temperature of 0° F. or below whereby the wax is precipitated, separating the precipitated wax from the solution of dewaxed oil in solvent, and then separating the dewaxed oil from the solvent by distillation.

FRANCIS X. GOVERS.